Patented Aug. 14, 1945

2,382,082

UNITED STATES PATENT OFFICE 2,382,082

METHYL SILICON POLYMERS AND METHOD OF PREPARATION

Rob Roy McGregor, Verona, and Earl Leathen Warrick, Pittsburgh, Pa., assignors to Corning Glass Works, Corning, N. Y., a corporation of New York No Drawing. Application July 26, 1943, Serial No. 496,210

10 Claims. (Cl. 252—78)

This invention relates to new compositions of matter, their preparation and uses, and, more particularly, to methyl silicon oxide polymers and their preparation.

This application is a continuation-in-part of our copending application Serial Number 490,520 filed June 11, 1943 and assigned to the assignee of the present invention.

Methyl silicon oxide polymers or methyl siloxanes as they are now commonly called are compositions which contain alternate silicon and oxygen atoms and methyl radicals attached to silicon through the carbon atom. They may be prepared either by hydrolysis of a hydrolyzable methyl-substituted silicane and condensation of the hydrolysis product or by hydrolysis of a mixture of different hydrolyzable methyl-substituted silicanes and co-condensation of the hydrolysis products. By hydrolyzable methyl-substituted silicanes we mean methyl derivatives of $SiH_4$ which contain readily hydrolyzable radicals such as halogens, amino groups, alkoxy, aroxy, acyloxy radicals, etc. Examples of such compounds are methylsilicon trichloride, dimethylsilicon dichloride, trimethylsilicon chloride, methyltriethoxysilicane, dimethyldiethoxysilicane, trimethylethoxysilicane, etc.

Methyl silicon oxide copolymers have been prepared by the hydrolysis and condensation of mixtures of compounds of the formulae $CH_3SiX_3$ and $(CH_3)_2SiX_2$, where X represents a readily hydrolyzable group of the kind named above. The products hitherto prepared in this manner have been thermally unstable liquids which when heated are readily converted to gels or resinous solids. It is highly desirable for certain purposes, such as high altitude flying, to find a hydraulic fluid which is adapted to function effectively over a wide temperature range and particularly at temperatures below —40° C. Because of their thermal instability, use of the above methyl silicon copolymers as hydraulic fluids, damping fluids, etc., has been too hazardous for their adoption commercially. It would be highly desirable to find one which is thermally stable and which possesses other properties such as low solidification temperature, low vapor pressure, relatively low viscosity-temperature coefficient and chemical stability.

One of the objects of our invention is to provide a thermally stable liquid methyl silicon oxide copolymer.

Another object of our invention is to provide a thermally stable methyl silicon oxide copolymer which consists of the structural units

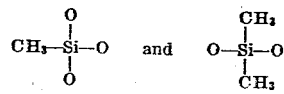

Another object of our invention is to provide a method of preparing a liquid methyl silicon oxide polymer which has a low solidification temperature, a low temperature-viscosity coefficient and which does not readily set to a gel at elevated temperatures.

Another object of our invention is to provide a liquid methyl silicon oxide polymer having an average of between about 1.80 and about 1.95 methyl radicals per silicon atom.

Still another object of the present invention is to provide a liquid methyl silicon oxide polymer which has a solidification temperature of less than —80° C.

In accordance with our invention, we have provided a method of preparing a stable liquid methyl silicon oxide polymer which comprises co-hydrolyzing and co-condensing a mixture of approximately 80 to 95 mol per cent of a hydrolyzable dimethyl silicane and approximately 5 to 20 mol per cent of a hydrolyzable mono-methyl silicane. Liquid copolymers are produced by this method which contain approximately 1.80 to 1.95 methyl radicals per silicon atom. They have solidification temperatures below —80° C., low temperature-viscosity coefficients; and do not gel after many hours at elevated temperatures.

The following examples illustrate methods of preparing the methyl silicon copolymers which we have found to be so stable. Varying the conditions of the reaction such as temperature and concentration of the polymerization catalyst produces changes in the viscosity of the product but does not affect its thermal stability.

Example 1

A mixture of .9 mol of dimethyldiethoxysilicane and .1 mol of monomethyltriethoxysilicane was dropped with stirring into half its volume of 2N HCl at such a rate that the temperature did not rise above 45° C. The whole mixture was then refluxed for four hours. An oil was produced which, after being washed with water and dried, had a viscosity of about 70 Saybolt seconds at 86° F.

Example 2

The oil prepared in Example 1 was increased in viscosity to about 135 Saybolt seconds at 86° F. by passing a $CO_2$ stream through it at 100 mm. pressure to remove lower more volatile polymers.

Example 3

A mixture of .9 mol of dimethyldiethoxysilicane and .1 mol of monomethyltriethoxysilicane was hydrolyzed by refluxing for four hours with an equal volume of a solution containing 50% alcohol (95%) and 50% concentrated HCl. After water washing and drying, the low polymers were removed as above by $CO_2$ treatment. The oil which resulted had a viscosity of about 375 Saybolt seconds at 86° F.

The products prepared in accordance with the above methods consist of the structural units

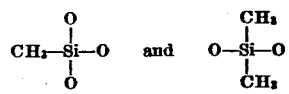

However, owing to the difficulty of obtaining complete hydrolysis and complete condensation there may be present some unhydrolyzed ethoxy radicals or the like or some hydroxyl groups but not in sufficient amounts to impair the properties of the liquid products.

The following table shows the relative thermal stability of methyl silicon oxide copolymers prepared from different mixtures of monomethyltriethoxysilicane and dimethyldiethoxysilicane. The first row gives the mol per cent of monomethyl compound present in the initial reaction mixture, the balance being the dimethyl compound. In item A are given the viscosities in centistokes of the copolymers as prepared prior to heat treatment. In item B are given the number of hours required to bring about gelation at 230° C.

It will be seen from the above table that a minimum solidification temperature is obtained in the range of 5 to 10 mol per cent of of the monomethyl compound.

The variation of viscosity with temperature has been measured for the copolymers having from about 1.80 to about 1.95 carbon atoms per silicon. In all cases the slope is flatter than for a commonly used hydrocarbon oil, "Gulfpride 40." The following table shows the comparative change of viscosity with temperature of "Gulfpride 40" and a methyl silicon oxide copolymer formed from 90 mol per cent of dimethyldiethoxysilicane and 10 mol per cent of methyltriethoxysilicane. In this table, the temperature-coefficient of viscosity or the change of viscosity with temperature is shown as the slope of the line given by plotting the logarithms of the viscosity $\eta$, as ordinates against the reciprocals of the absolute temperatures as abscissae. The lower the value of the slope between given temperatures, the smaller the change in viscosity of the material between these temperatures.

Table III

| Liquid | Solidification temperature | $\dfrac{\Delta \text{Log } \eta}{\Delta 1/T}$ | |
|---|---|---|---|
| | | 100° to 25° C. | 25° to −50° C. |
| | ° C. | | |
| "Gulfpride 40" | −19 | 2,218 | |
| Copolymer (90–10) | −84 | 710 | 1,000 |

A comparison of the viscosity of a polymeric methyl siloxane of our invention having a ratio of 1.9 methyl groups per silicon with the viscosity of a high grade hydraulic oil from a petroleum base is given in the following table.

Table I

| | Percent mono (mols) | | | | | | | | | |
|---|---|---|---|---|---|---|---|---|---|---|
| | 0 | 2 | 5 | 10 | 15 | 20 | 25 | 30 | 35 | 40 |
| A—Initial viscosity, centistokes | 42 | 23.7 | 30.7 | 26 | 35.0 | 60.7 | 102.0 | 631.0 | 838.4 | Gel |
| B—Time to get at hours—230° C | 11 | 14 | 16 | 26 | 28 | 17 | 10 | 5 | 4 | 0 |

The above table clearly shows the outstanding thermal stability of the copolymers containing not more than about 20 per cent of the monomethyl compound. Furthermore, samples of copolymers within this range have been heated at 100° C. for over 600 hours without gelation.

In the following table are shown the extremely low temperatures at which the copolymers of our invention solidify. These solidification temperatures are equilibrium temperatures at which melting and freezing coincide if cooling is obtained by a liquid nitrogen bath (−195° C.) and heating by a dry ice acetone bath (−76° C.) or by room temperature (25° C.) while stirring.

Table IV

| Temperature, ° F. | Methyl siloxane | Petroleum base hydraulic oil (Univis 48) |
|---|---|---|
| 210 | 68 | 48 |
| 100 | 170 | 165 |
| 0 | 900 | 5,800 |
| −22 | 1,500 | 15,000 |
| −40 | 2,490 | 60,000 |

It will be seen from the above table that between 100 and 0° F., for example, the increase in vis-

Table II

| | Percent mono (mols) | | | | | | | | | |
|---|---|---|---|---|---|---|---|---|---|---|
| | 0 | 2 | 5 | 10 | 15 | 20 | 25 | 30 | 35 | 40 |
| Solidification temperature _____ degrees | −45 | −68 | −92 | −84 | −80 | −76 | −73 | −69 | −60 | −52 | cosity of the petroleum oil is nearly eight times that of the methyl siloxane.

The copolymers having a composition lying within the range of our invention are eminently adapted to be used as damping fluids for vibrating members or as hydraulic fluids for fluid pressure actuatable devices. Their low solidification temperatures, low vapor pressure, low viscosity temperature coefficient and their thermal stability qualify them for these uses. In addition, they are chemically stable, being inert to oxygen, commonly used construction metals, plastics, and natural and synthetic rubber.

We claim:

1. In a fluid pressure actuatable device, a hydraulic fluid comprising a liquid polymeric methyl siloxane having an average of approximately 1.9 methyl groups per silicon atom and having a solidification temperature below $-80°$ C., said siloxane consisting essentially of recurring structural units which correspond to the formulae $CH_3SiO_{3/2}$ and $(CH_3)_2SiO$, respectively, said units being joined together by silicon-oxygen linkages.

2. In a fluid pressure actuatable device, a hydraulic fluid comprising a liquid polymeric methyl siloxane having an average of approximately 1.9 methyl groups per silicon atom and consisting essentially of recurring structural units which correspond to the formulae $CH_3SiO_{3/2}$ and $(CH_3)_2SiO$, respectively, said units being joined together by silicon-oxygen linkages.

3. In an apparatus for damping a vibrating member, a damping fluid comprising a liquid polymeric methyl siloxane having an average of approximately 1.80 to approximately 1.95 methyl groups per silicon atom and consisting essentially of recurring structural units which correspond to the formulae $CH_3SiO_{3/2}$ and $(CH_3)_2SiO$, respectively, said units being joined together by silicon-oxygen linkages.

4. The method of preparing a liquid methyl silicon oxide copolymer which comprises mixing dimethyldiethoxysilicane with monomethyltrithoxysilicane in the molar ratio of approximately 9 to 1, hydrolyzing the mixture with aqueous acid, condensing the methyl silicon hydrolysis product, recovering said condensed methyl silicon hydrolysis product and then passing carbon dioxide gas therethrough at elevated temperature and reduced pressure to remove the volatile lower polymers.

5. The method of preparing a liquid methyl silicon oxide copolymer which comprises mixing dimethyldiethoxysilicane with monomethyltriethoxysilicane in the molar ratio of approximately 9 to 1, adding the mixture slowly to hydrochloric acid while maintaining the temperature below $50°$ C., refluxing the mixture until an oily product is obtained and then washing and drying said product.

6. Liquid polymeric siloxane having an average of approximately 1.80 to approximately 1.95 methyl groups per silicon atom and consisting essentially of recurring structural units which correspond to the formulae $CH_3SiO_{3/2}$ and $(CH_3)_2SiO$, respectively, said units being joined together through silicon-oxygen linkages and said siloxane having a solidification temperature less than $-80°$ C. and remaining liquid for at least 16 hours at $230°$ C. without gelation.

7. The method of preparing a methyl silicon oxide copolymer which comprises hydrolyzing a mixture consisting of 80 to 95 mol per cent of $(CH_3)_2SiX_2$, the remainder being $CH_3SiY_3$, said hydrolysis being carried out in the presence of aqueous acid and condensing the methyl silicon hydrolysis product, where X and Y are readily hydrolyzable groups selected from the class consisting of halogens and alkoxy radicals.

8. The method of preparing a methyl silicon oxide copolymer which comprises hydrolyzing a mixture consisting of 80 to 95 mol per cent of dimethyldiethoxysilane, the remainder being methyltriethoxysilane, said hydrolysis being carried out in the presence of acid and condensing the methyl silicon hydrolysis product.

9. Liquid polymeric methyl siloxane having an average of approximately 1.9 methyl groups per silicon atom and consisting essentially of recurring structural units which correspond to the formulae $CH_3SiO_{3/2}$ and $(CH_3)_2SiO$, respectively, said units being joined together through silicon-oxygen linkages, and said siloxane remaining liquid for at least 16 hours at $230°$ C. without gelation and having a solidification temperature between about $-80$ and about $-90°$ C. and a viscosity temperature coefficient as represented by the expression $$\frac{\Delta \log \eta}{\Delta 1/T}$$

where $\eta$ is the viscosity and T the absolute temperature, of approximately 700 for the temperature interval 100 to $25°$ C. and of approximately 1,000 for the temperature interval 25 to $-50°$ C.

10. In a hydraulic apparatus, a hydraulic fluid comprising a liquid polymeric methyl siloxane having an average of approximately 1.80 to approximately 1.95 methyl groups per silicon atom and consisting essentially of recurring structural units which correspond to the formulae $CH_3SiO_{3/2}$ and $(CH_3)_2SiO$, respectively, said units being joined together by silicon-oxygen linkages.

ROB ROY McGREGOR.
EARL LEATHEN WARRICK.